United States Patent
Barrett, Jr.

[11] 3,786,695
[45] Jan. 22, 1974

[54] REDUNDANT PITCH LINK

[75] Inventor: Lawrence D. Barrett, Jr., Glen Mills, Pa.

[73] Assignee: The Boeing Company, Seattle, Wash.

[22] Filed: Apr. 28, 1972

[21] Appl. No.: 248,370

[52] U.S. Cl. .................................. 74/586, 287/60
[51] Int. Cl. ...................................................... F16l
[58] Field of Search..... 74/586; 287/60, 88; 29/175, 29/175 A

[56] References Cited
UNITED STATES PATENTS

| | | | |
|---|---|---|---|
| 1,110,201 | 9/1914 | Hardick | 287/60 |
| 797,635 | 8/1905 | Telejszo | 287/60 |
| 2,813,733 | 11/1957 | Herrmann | 287/60 |
| 1,265,104 | 5/1918 | Ogden | 287/60 |
| 3,536,346 | 10/1970 | Ulderup | 287/88 |
| 3,378,287 | 4/1968 | Ulderup | 287/88 |

Primary Examiner—Charles J. Myhre
Assistant Examiner—Ronald Lazarus
Attorney, Agent, or Firm—Robert S. Lipton, Esq.; Joseph M. Carr, Esq.

[57] ABSTRACT

A redundant pitch link for providing a connection between a helicopter rotor blade and control assembly. A primary load path is provided for use during normal operation and a secondary load path is provided in the event the primary load path becomes inoperable. The pitch link is constructed by locating a primary turn buckle around a secondary or back-up turn buckle. Teflon fabric is used to prevent fretting while maintaining the secondary turn buckle in a substantially unloaded condition during normal usage as well as when the secondary turn buckle is operative due to failure of the primary turn buckle.

17 Claims, 4 Drawing Figures

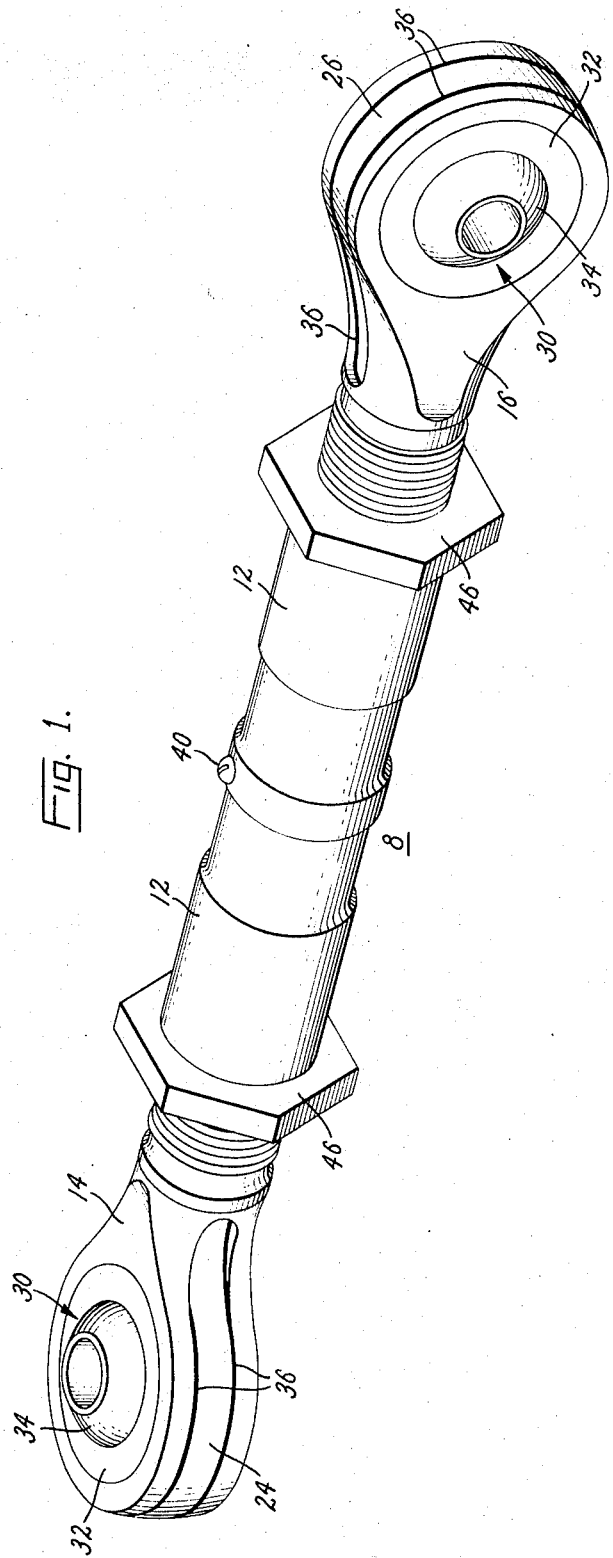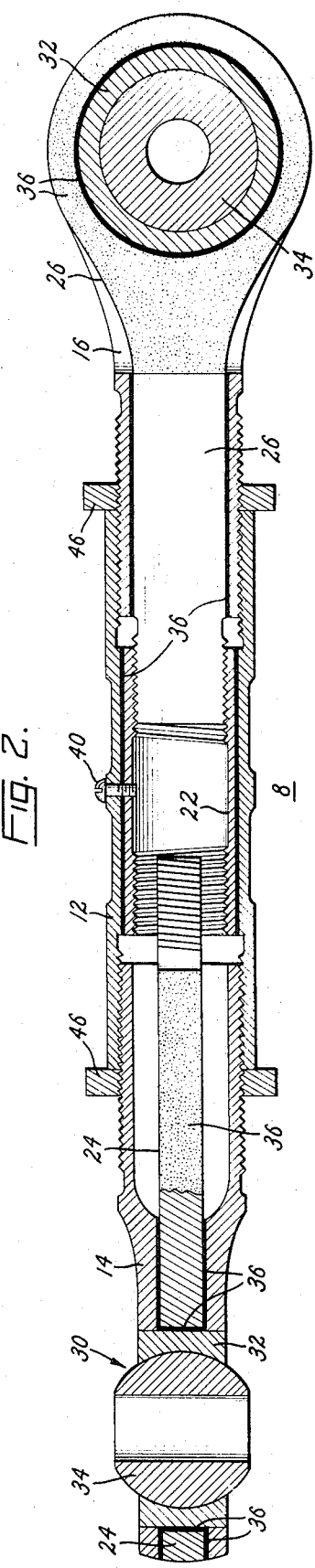

REDUNDANT PITCH LINK

BACKGROUND OF THE INVENTION

1. Field of the Invention

This invention relates generally to load carrying structural links and in particular to pitch links used on rotary wing aircraft. An aircraft of this type has rotor blades which are attached to a rotor hub such that the blades may rotate along their longitudinal axis. This angle of rotation or pitch angle is controlled and maintained by a pitch link which connects the blade to a control assembly. Pitch links of this type may be cyclically subjected to high levels of stress in that they are alternately loaded in a compression and tension sequence. This type of loading may cause them to fail structurally. The failure of a pitch link may result in loss of control of the aircraft.

2. Description of the Prior Art

Single load path pitch links which are adjustable in length are well-known in the prior art.

Heretofore, one of the methods used to insure the structural integrity of such pitch links for rotary wing aircraft has been to design the links to carry loads greater than they would normally be expected to encounter. This has proven undesirable in that it adds weight to the aircraft and is not positive assurance that structural failure will not occur.

Frequent inspection of the pitch link have also been used in an attempt to detect minute cracks which would foretell possible future structural failure. The disadvantage of this approach is that many structural failures are not forewarned by inspectable cracks. This has the further disadvantage of increasing maintenance costs because of the time and manpower expended in performing the inspections.

Another prior art solution to the problem has been to design dual load path pitch links. Prior art solutions of this type proved to be unsatisfactory for two reasons. First, both load paths were loaded during normal operation such that structural degradation occurred in both load paths simultaneously due to the fatigue effects resulting from the cyclic operation of the pitch link. Secondly, the dual load path pitch links of the prior art were not adjustable, a severe if not limiting disadvantage.

SUMMARY OF THE INVENTION

An object of this invention is to provide a dual load path structural member which will remain operable in the event one of the two load paths structurally fails.

Another object of this invention is to provide a dual load path pitch link for use in a rotary wing aircraft.

Another object of the invention is to provide a dual load path pitch link for rotary wing aircraft and which is adjustable in length.

A further object of this invention is to provide a dual load path pitch link for use in rotary wing aircraft wherein the secondary load path is isolated from the primary load path so as to maintain it in a substantially unloaded condition during normal usage of the pitch link.

The pitch link of the present invention consists of one turn buckle concentrically located about a second turn buckle. Each turn buckle consists of a barrel having a rod connected at each end thereof. The inner and outer rods of one end of the pitch link are adapted to be pivotally connected to the rotor blade while the inner and outer rods at the other end can be pivotally connected to the control assembly.

Various other objects and advantages will appear from the following description of the invention.

BRIEF DESCRIPTION OF THE DRAWINGS

In the drawings in which like numerals refer to like parts:

FIG. 1 is a view of a helicopter pitch link embodying the invention;

FIG. 2 is a cut-away view of the pitch link illustrated in FIG. 1;

DESCRIPTION OF THE PREFERRED EMBODIMENT

Figure 3:
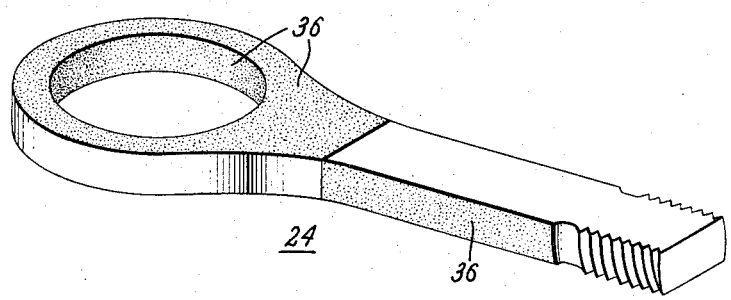
FIG. 3 is a view of one of the inner rods shown in FIGS. 1 and 2.

Refer now to FIGS. 1 and 2 which show the preferred embodiment of the pitch link 8. The primary load path of the pitch link 8 is the outer turn buckle which consists of an outer barrel 12 each end of which is connected to outer rods 14 and 16, respectively.

The outer turn buckle is located concentrically about an inner turn buckle which is the secondary load path of the pitch link. The secondary load path is to be utilized only when the primary load path has failed structurally, and consists of an inner barrel 22 each end of which is connected to inner rods 24 and 26, respectively.

For purposes of clarity and simplicity the following discussion will refer only to the outer and inner rod ends 14 and 24, respectively. It is to be understood, however, that the following discussion will be equally applicable to the outer and inner rod ends 16 and 26.

Rods 14 and 24 each have a hole in their adjacent ends for connecting purposes. The outer rod 14 has been bifurcated by placing a slot in this end of the rod. When the inner rod 24 is properly inserted in the outer rod 14 the end having the hole therein is located between the bifurcations of the outer rod 14 and the holes in both rods are aligned such that they have a common center. For the pitch link of the present invention a self-aligning bearing assembly 30 is inserted in the holes for use in connecting the link to the aircraft.

The self aligning bearing assembly 30 is used on the preferred embodiment as the pitch link must be mounted to the helicopter rotor blade and control system in a manner permitting universal movement. This is a direct result of the fact that the rotor blade is universally mounted to the helicopter, thereby requiring that the pitch link in turn be universally mounted to the rotor blade. Similar considerations require that the pitch link be universally mounted to the control system.

The self aligning bearing 30 has a race 32 with a ball 34 universally mounted therein. The ball 34 may rotate freely in all directions within the race 32. A hole has been located in the ball 34 for rigidly connecting it, and thereby the pitch link, to either the helicopter rotor blade or control system.

In order to prevent the inner rod from carrying any of the loads during normal operation of the pitch link it is necessary that the diameter of the hole of the inner rod 24 be slightly larger than the hole of the outer rod 14. When the self aligning bearing assembly 30 is inserted in the holes of rods 14 and 24 the race 32 of the assembly is in firm contact with the inner surface of the outer rod 14. The increased diameter of the hole in the inner rod 24 creates a gap between the inner rod 24 and the race 32. It is this gap which results in the inner rod 24 being in an unloaded condition.

Although the preferred embodiment utilizes the self aligning bearing 30 as an attachment device, the race 32 of the self aligning bearing is the only part thereof which comes in contact with the other portions of the pitch link. It is therefore obvious that for other applications where a universal pivot is not desired other attachment devices, such as a rod, may be used as an attachment device without departing from the spirit of the invention.

A difference in hole diameter alone, though accomplishing the result desired in that the inner rod remains substantially unloaded, is not completely satisfactory for the highly dynamic purpose for which a pitch link is used. Due to the gap between inner rod 24 and the race 32, the inner turn buckle is free to move within the outer turn buckle. Due to the high vibrations encountered when the link is used on a helicopter, the abutting surface of the inner rod 24 would be caused to vibrate against the outer race 32 of the self aligning bearing 30 with the result that fretting would occur in the region of impact. Fretting would cause an undesirable loss in the structural capability of the inner turn buckle. The vibrations necessarily load the inner turn buckle, however, these loads are insubstantial compared with the normal operating loads.

This problem could be overcome by securing the inner turn buckle to the outer turn buckle, as will be discussed subsequently, so that the inner rod 24 will not come in contact with the outer race 32 during normal operation.

The latter solution is also not completely satisfactory as in the event the outer turn buckle fails the gap between the now operative inner turn buckle and the outer race will permit relative movement between them resulting in high vibrations due to the cyclic loading to which the pitch link is subjected.

In the following discussion refer to FIGS. 2 and 3.

These problems have been overcome in the present invention by the introduction of a coating or lining of resilient material 36 along the walls of the hole in the inner rod 24 and substantially filling the gap between outer race 32 and inner rod 24. The coating of resilient material 36 overcomes the problems of fretting and vibration. The primary problem of fretting is overcome in that the resilient material 36 prevents the two metal surfaces from coming into direct contact and by absorbing some of the energy of such a contact. Due to the resilience of the material 36 the force involved in a direct contact between the inner rod and the outer race, which would normally be a single line contact, is distributed over the surface of both the inner rod and the race. The distribution of this force over a larger surface area directly decreases the likelihood of fretting. The energy absorbing characteristics of the resilient material decrease vibration in the pitch link. These advantages are applicable both during normal operation of the pitch link and when the outer turn buckle has failed resulting in the inner turn buckle being the only operative load path.

As will be understood by those skilled in the art, many different types of materials may be used for the resilient material 36. It has been found for the present embodiment of the invention that a single layer of teflon fabric approximately 0.021 inches thick is preferable. Such a teflon fabric is commercially available and is known as Type 1 Fabroid Teflon Fabric manufactured by the Lear Siegler Corporation.

Many different methods may be used to secure the resilient material 36 to the inner rod 24. Phenolic resins have been found to be satisfactory bonding agents for use in securing teflon fabric to the metal used in the preferred embodiment of the rod 24. A particular phenolic resin known as Plyophen 23-900 manufactured By Reichold Chemicals, Inc. has been used successfully.

Any suitable material may be used for the link of the present invention. The particular metal used in the preferred embodiment is a stainless steel which has been designated by the Aerospace Materials Society as AMS 5643 and which has been heat treated to a condition designated by that Society as H1050.

It has been found that when the preferred embodiment of the invention is used as a pitch link there should be a clearance of 0.003 inches between the outer race 32 self aligning bearing and the resilient material 36 when installed on the inner rod 24. It is to be recognized that the magnitude of the clearance just referred to and the thickness of the resilient material employed are variable, being functions of the purpose to which the invention is put and the operating environment in which it is utilized.

Due to the high vibrations encountered by the pitch link during normal operations, it has been found desirable to locate additional amounts of resilient material 36 at other locations on the inner rod 24. The additional amounts of resilient material are located wherever contact between the inner rod 24 and the outer rod 14 is possible; the purpose being to prevent direct contact and utilize the energy absorbing properties of the resilient material so as to prevent fretting and the attendant structural degradation. These types of areas on the preferred embodiment are the sides of the inner rod 24 where the rod 24 abuts against the outer rod 14 and where the outer surface of the inner barrel 22 is in close proximity to the outer barrel 12. Another such area is on the neck of the inner rod 24 where it passes through the outer rod 14. Both of these areas are shown in FIGS. 2 and 3 with resilient material 36 applied thereto. For the pitch link application of the preferred embodiment it has been found that a different thickness of resilient material is desired for these areas compared to the earlier application. A thickness of 0.011 to 0.013 inches of the resilient material 36 has been found satisfactory for the purpose.

In assembling the pitch link of the present invention the inner rod 24 is inserted into the outer rod 14. The self aligning bearing 30 is then inserted in the common hole passing through the ends of rods 14 and 24. Though it is preferable that the self aligning bearing 30 be inserted in the hole at this point it could be delayed and inserted as the final step in the assembly procedure. The bearing assembly is secured in the hole by roll swaging a groove which has been machined in the outer race 32 so as to form a lip over the edge of the hole in rod 14. The hole in rod 14 may have a chamfer machined thereon to facilitate the swaging process.

The same assembly procedure is followed with the other rods 16 and 26. The inner barrel 22 is inserted in the outer barrel 12 and secured thereto by the screw 40. Although a second function of the screw 40 will be described, its primary purpose is to secure the inner barrel 22 to the outer barrel 12 as an aid in the assembly procedure. This is a factor to be taken into account when the strength and size requirements of the screw 40 are determined.

The pair of rods 14 and 24 are now simultaneously screwed into the barrels 12 and 22. In order that this step be accomplished smoothly, it is necessary that the outer rod be capable of rotation with respect to the outer barrel simultaneously with the rotation of the inner rod with respect to the inner barrel. In order to achieve this result the threads must of the same pitch on both outer and inner turn buckle components. In addition, the threads of the parts must be properly aligned during the machining or assembly process. This is required for a successful assembly in this manner of the preferred embodiment since the outer rod will not rotate with respect to the inner rod due to the configuration of the rod ends, and the outer barrel will not rotate with respect to the inner barrel while the screw 40 is engaged. Though preferable in the particular assembly process used these features are necessary if both the inner and outer turn buckles are to be simultaneously adjustable in length, thereby making the assembled pitch link adjustable while installed on the aircraft. It is not necessary for either adjustability or assembly that the pitch of the threads of rods 14 and 24 be identical to the pitch of the threads of rods 16 and 26 although it must be emphasized thread pitch identity is necessary at each end of the pitch link.

It is generally required that helicopter pitch links be adjustable in length. It is a further requirement that the helicopter pitch links be adjustable in length while they are installed on the helicopter, i.e., without disconnecting either end of the pitch link from the helicopter. This type of adjustability has been accomplished in the pitch link of the present invention by having the rods 24 and 14 threaded in a manner opposite that of rods 26 and 16. This adjustment may also be accomplished by providing the threads on rods 24 and 14 with a different pitch from that of the threads on rods 26 and 16. It is also necessary that the inner barrel 22 be secured to the outer barrel 12 by the screw 40, as was useful in the assembly process. This permits the length of the pitch link of the present invention to be adjustable after it is installed on the helicopter. This adjustment may be effected by simply turning the outer barrel and thereby the inner barrel, as they are connected by the screw 40, in the appropriate direction. Once the desired length has been reached it may be set by rotationally securing the outer rods 14 and 16 to the barrel 12 through the use of the lock nuts 46.

The lock nuts 46 in addition to fixing the length of the pitch link also fix the angular position of rods 14 and 24 with respect to rods 16 and 26.

During normal operation of the pitch link 8 the loads are carried by the outer turn buckle. The loads are passed to the outer turn buckle by the outer race 32 of the self aligning bearing 30 to the outer rods 14 and 16 of the outer turn buckle. As previously discussed, the inner turn buckle is substantially isolated from any of the loads.

In the event there is a structural failure in the outer turn buckle either in the outer rods 14 and 16 or the outer barrel 12 the loads are then transmitted to the inner turn buckle through the resilient material 36 to the inner rods 24 or 26 by the race 32.

Due to aerodynamic and vibration considerations, it is highly desirable that the individual rotor blades of a helicopter rotor travel in substantially the same path or disc as the rotor rotates. A change in length of the pitch link 8 results in the particular blade to which it is attached to deviate from this path or disc resulting in a lessening or aerodynamic performance and high vibrations. It is therefore a requirement of the pitch link 8 that its length remain fixed both during normal operation and when the inner load path is carrying the load. This requirement is met through an additional use of the screw 40, which was useful during the assembly procedure, and which prevents the inner and outer barrels 22 and 12 from rotating with respect to each other. In the event there is a structural failure of the outer rod 14, loads are then carried by the inner rod 24 to the inner barrel 22. Were it not for the screw 40 the inner barrel 22 would be free to rotate under the vibratory loads it is subjected to, thereby permitting the length of the inner turn buckle to change. The screw 40 secures the inner barrel 22 to the outer barrel 12 which is prevented from rotating as a result of its still being secured to the unfailed outer rod 16 by the lock nut 46. Indeed, no matter what part of the outer load path fails, the inner barrel will remain stationary relative to the outer. This added use of the screw 40 will effect the size and therefore strength of the screw when used for this purpose.

Though the screw 40 secures the inner barrel and thereby prevents a change in length of the pitch link a failure of one of the outer rods 14 or 16 may permit rotational movement of the inner rod 24 with respect to the inner rod 26, as there is no lock nut preventing such rotation. This may be undesirable if the pitch link 8 is required to carry any torsional loads or if one end of the link is to be non-rotatable with respect to the other end, notwithstanding a structural failure of one of the outer rods 14 or 16.

Figure 4:
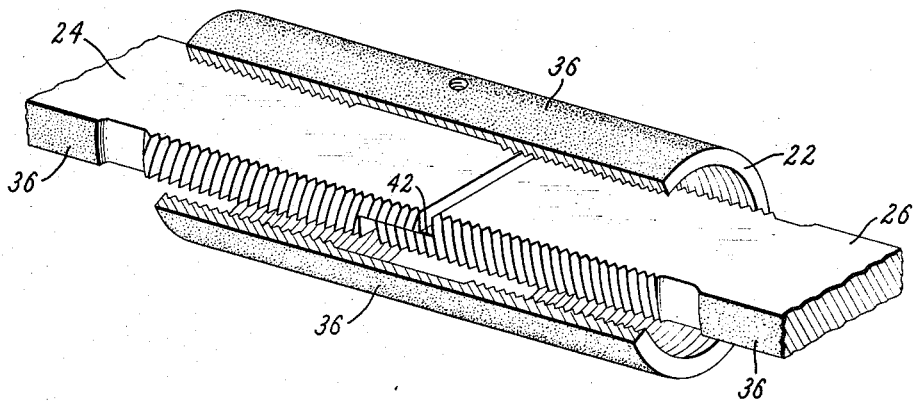
FIG. 4 is a partial view cut-away of a portion of an embodiment of the invention shown in FIGS. 2 and 3.

Referring now to FIG. 4, a torsional load capability may be achieved by modifying the inner rods 24 and 26 as shown. The length of each of the rods is extended such that they each extend beyond the mid point of the inner barrel 22. This is made possible by machining the adjacent ends of the rods 24 and 26 in the manner shown so that they may overlap and abut against one another at 42, thus preventing them from rotating with respect to each other.

It is to be understood that other embodiments of dual load path structural members and variations of dual load path structural members wherein the secondary load path is isolated from the primary load path and thereby unloaded during normal operation, which may be adjustable in length, may be made without departing from the spirit thereof.

What is claimed is:

1. A dual, load carrying, structural link adapted to be connected to a member which comprises:
   an attachment means to connect the lend to a member;

a primary member connected to said attachment means for carrying loads;

a secondary member joined to said attachment means for carrying loads in the event said primary means for carrying loads, said secondary member is unable to carry loads, said secondary member being substantially unloaded while said primary member is carrying the load; and a layer of resilient material interposed between said attachment means and said secondary member so as to maintain the relative position of said secondary member with respect to said primary member when said secondary member is substantially unloaded.

2. The link of claim 1 wherein said resilient material is teflon fabric.

3. The link of claim 1 wherein said primary member is hollow and said secondary member is located therein.

4. The link of claim 3 wherein said primary and secondary members are turn buckles each of which includes a barrel and a pair of rods each of which is adapted to threadably engage one of the ends of said barrel.

5. The link of claim 4 wherein each primary rod has a hole therein, each secondary rod has a hole therein of a larger diameter than the diameter of the hole in said primary rod, said resilient material is adhered to the wall of the hole in said secondary rod, said secondary rod is aligned within said primary rod with the holes thereof having a common center to form a single opening, and said attachment means is inserted in said opening and secured therein.

6. The link of claim 1 wherein:

said primary member includes a primary barrel, a pair of hollow primary rods each of which is threadably engaged with said primary barrel at one end while at the other end a hole is provided therethrough;

said secondary member includes a secondary barrel located concentrically within said primary barrel, a pair of secondary rods each having one end threadably engaged with an end of said secondary barrel with the other end having a hole therethrough of a diameter greater than said hole in each of said primary rod, each secondary rod being located within one of said primary rods such that the holes passing through said primary and said secondary rods are aligned to form an opening at the end of said link; and said attachment means includes a pair of self aligning bearings each of which has an outer race and is located in said opening at either end of said link with the outer race being in firm contact with the abutting surface of said primary rod.

7. The link of claim 6 wherein said primary barrel is secured to said secondary barrel so as to prevent rotation therebetween.

8. The link of claim 7 wherein said pairs of primary rods and secondary rods are threaded so as to enable the length of said link to be changed upon rotation of said primary barrel.

9. The link of claim 6 wherein said pair of secondary rods have flattened ends which abut and overlay each other within said secondary barrel when said rods are threadably engaged therewith, thereby preventing rotation of one secondary rod with respect to the other secondary rod.

10. The link of claim 6 wherein said resilient material is teflon fabric.

11. A helicopter pitch link for use in linking a helicopter rotor blade to a control system comprising:

a primary barrel;

a pair of hollow primary rods, each being adapted to be threadably connected at one end of said primay barrel while having a bifurcated opposite end with a hole therethrough, a secondary barrel located concentrically within said primary barrel;

a pair of secondary rods, threadably connected to opposite ends of said secondary barrel, the opposite ends of said secondary rods having a hole located therein of a diameter greater than that of the holes passing through the bifurcations of said primary rods, said secondary rods each being located within each of said primary rods such that the holes in said primary and secondary rods are aligned and form an opening at each end of said link;

a pair of self aligning bearings having an outer race, each bearing being located in the opening at the ends of said link, each outer race being in firm contact with the abutting surface of the respective primary rod, one of said pair of self aligning bearings being operably connected to the helicopter rotor blades and the other self aligning bearing being connected to the control system; and a resilient material interposed between said secondary rods and the outer races of said self aligning bearings.

12. The helicopter pitch link of claim 11 wherein said resilient material is teflon fabric and said teflon fabric firmly lines each secondary rod to prevent direct contact between said bearing outer race and said secondary rod.

13. The helicopter pitch link of claim 11 wherein said primary barrel is prevented from rotating with respect to said secondary barrel by a screw passing through said outer barrel and threadably engaging said secondary barrel.

14. The helicopter pitch link of claim 11 wherein each rod of said pair of secondary rods has material removed from that end which threadably engages the inner barrel and is of sufficient length so that said pair of secondary rods overlap and abut against one another when engaged with said secondary barrel thereby preventing said secondary rods from rotating with respect to one another.

15. The helicopter pitch link of claim 11 wherein each primary rod and the secondary rod located therein have threads in the same direction and pitch and which are machined so as to permit simultaneous engagement of said rods with their respective barrels.

16. The helicopter pitch link of claim 13 wherein one of the primary rods of said pair of primary rods and the secondary rod located therein are threaded in a common direction opposite to the direction of the threads of the remaining primary rod and the secondary rod thereby permitting the length of said link to be changed upon rotation of said primary barrel.

17. The helicopter pitch of claim 13 wherein one of the primary rods of said pair of primary rods and the secondary rod located therein are threaded in a common direction and have a pitch which is different but in the same direction from that of the threads of the remaining primary rod and secondary rod thereby permitting the length of said link to be changed upon rotation of said primary barrel.

* * * * *

UNITED STATES PATENT OFFICE
CERTIFICATE OF CORRECTION

Patent No. __3,786,695__     Dated __Jan. 22, 1974__

Inventor(s) __Lawrence D. Barrett, Jr.__

It is certified that error appears in the above-identified patent and that said Letters Patent are hereby corrected as shown below:

Claim 1, line 3, delete the word "lend" and insert in its place the word "link";

Claim 11, line 5, delete the word "primay" and insert in its place the word "primary"; and Claim 17, line 1, insert after the word "pitch" the word "link".

Signed and sealed this 19th day of November 1974.

(SEAL)
Attest:

McCOY M. GIBSON JR.
Attesting Officer

C. MARSHALL DANN
Commissioner of Patents